S. H. CONWELL.
METAL END STRUCTURE FOR RAILWAY CARS.
APPLICATION FILED NOV. 29, 1919.
1,388,849.
Patented Aug. 30, 1921.
5 SHEETS—SHEET 1.
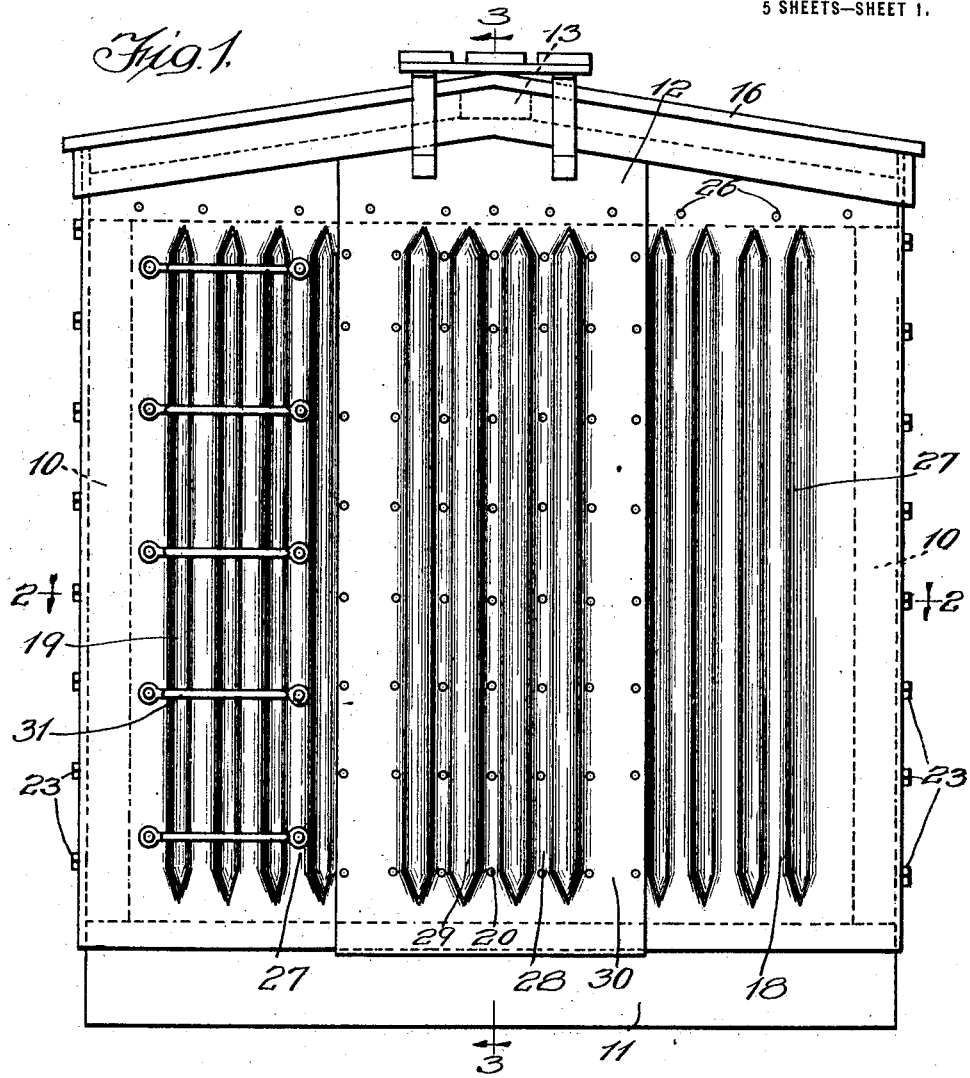
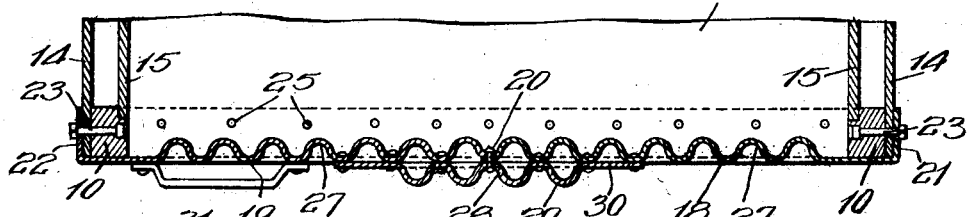

S. H. CONWELL.
METAL END STRUCTURE FOR RAILWAY CARS.
APPLICATION FILED NOV. 29, 1919.

1,388,849.

Patented Aug. 30, 1921.

Witnesses:
W. F. Kilroy
Harry R. L. White.

Inventor:
Samuel H. Conwell
By Barnett Fulman
Attys.

S. H. CONWELL.
METAL END STRUCTURE FOR RAILWAY CARS.
APPLICATION FILED NOV. 29, 1919.

1,388,849.    Patented Aug. 30, 1921.
5 SHEETS—SHEET 3.

Witnesses:
W. F. Kilroy
Harry R. L. White.

Inventor:
Samuel H. Conwell
By Barnett & Ullman
Attys.

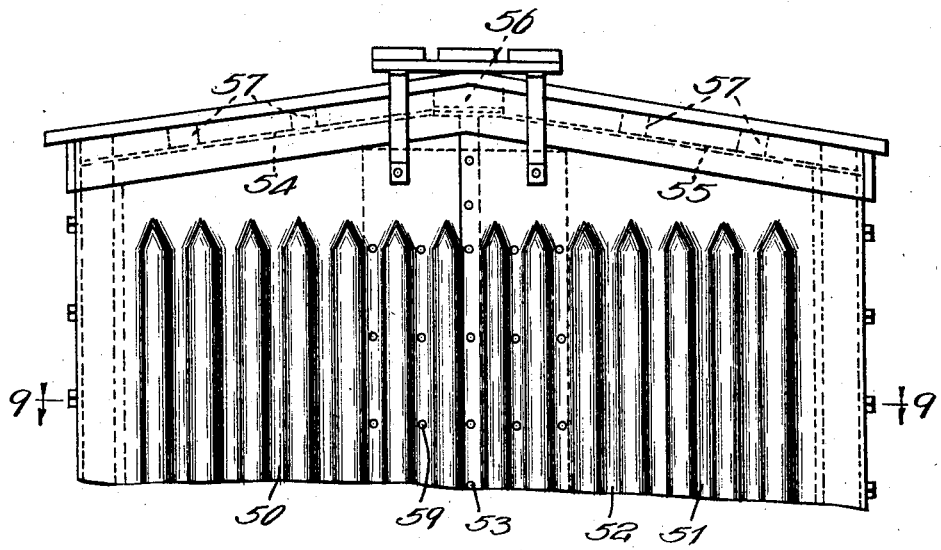
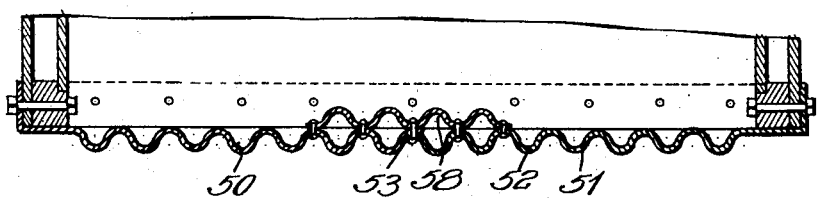
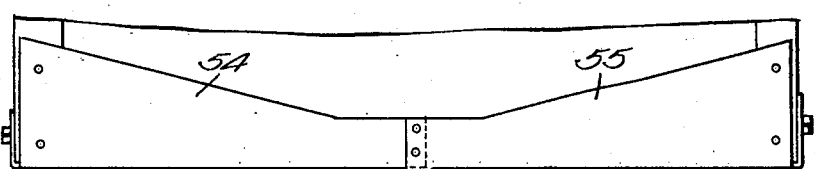

S. H. CONWELL.
METAL END STRUCTURE FOR RAILWAY CARS.
APPLICATION FILED NOV. 29, 1919.
1,388,849.
Patented Aug. 30, 1921.
5 SHEETS—SHEET 5.
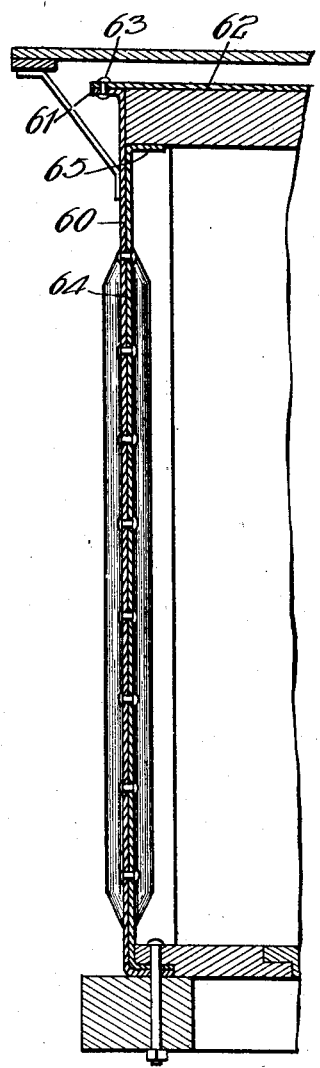
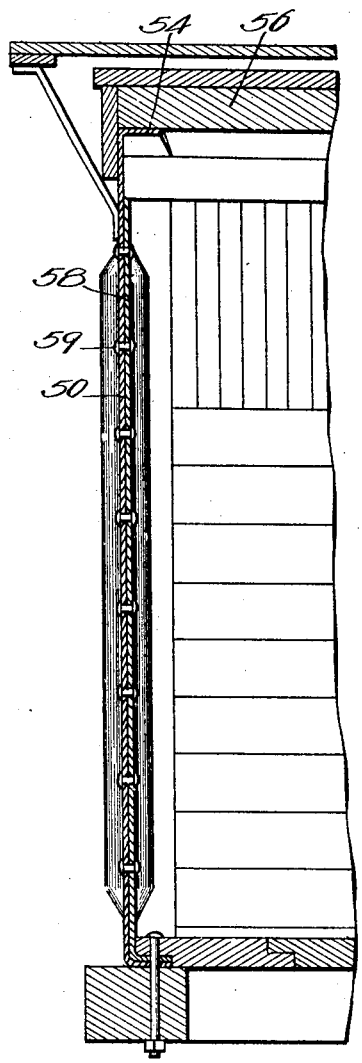

UNITED STATES PATENT OFFICE.

SAMUEL H. CONWELL, OF CHICAGO, ILLINOIS, ASSIGNOR TO WALTER P. MURPHY, OF NEW YORK, N. Y.

METAL END STRUCTURE FOR RAILWAY-CARS.

1,388,849. Specification of Letters Patent. Patented Aug. 30, 1921.

Application filed November 29, 1919. Serial No. 341,455.

*To all whom it may concern:*

Be it known that I, SAMUEL H. CONWELL, a citizen of the United States, residing at Chicago, in the county of Cook and State of Illinois, have invented certain new and useful Improvements in Metal End Structures for Railway-Cars, of which the following is a specification.

My invention relates to a sheet metal end structure for a railway car consisting of one or more sheet metal panels formed with rigidifying or stiffening corrugations adapted to transmit to the car framing the various stresses to which a car end structure is subjected when in service.

One of the principal objects of my invention is to provide an improved metal end structure for a railway car in which the reinforcing ribs or corrugations of the structure are so disposed with relation to each other as will provide the greatest strength and rigidity at the point where such strength and rigidity will be most effective in resisting the shocks and strains due to the inertia thrusts of the cargo and which will also reinforce the end of the car so that it will withstand the various other stresses resulting from the weaving movement of the car or other causes.

Another object of the invention is to provide a sheet metal end structure, of the above character, in which the cross sectional area of the reinforcing ribs may be greatest at the point where strength is most desired without conflicting with the provisions of the Interstate Commerce Commission relating to clearances between adjacent cars.

The invention has for further objects the novel arrangement, construction and combination of parts hereinafter described and claimed for carrying out the above stated objects and such other objects as will appear from the following description.

The invention is illustrated in certain preferred embodiments in the accompanying drawings, wherein—

Figure 1 is an end view in elevation of the superstructure of a railway box car, showing a sheet metal end wall constructed in accordance with my invention applied thereto;

Fig. 2 is a sectional plan view taken on line 2—2 of Fig. 1;

Fig. 8 is a front view in elevation of the upper portion of a railway box car showing a modified form of end construction applied thereto.

Fig. 9 is a sectional plan taken on line 9—9 of Fig. 8.

Fig. 10 is a plan view of the structure shown in Fig. 8 with the roof structure omitted.

Fig. 11, is a vertical sectional view taken through the center of the structure shown in Fig. 8, and Fig. 12 is a vertical sectional view illustrating a further modification.

Like characters of reference designate like parts.

Figure 3:
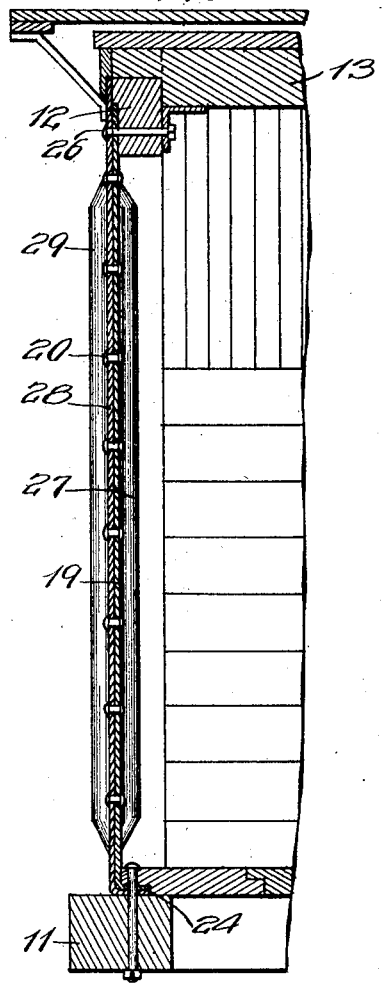
Fig. 3 is a vertical sectional view taken on line 3—3 of Fig. 1.

Referring first to Figs. 1 to 3 inclusive of the drawings; 10 designates the corner posts at one end of a car; 11 the end sill; 12 the end plate; 13 the ridge pole; 14 the outer side sheathing; 15 the inner lining; 16 the roof boards and 17 the flooring of the car.

The end wall of the structure shown in the above figures comprises a panel composed of metal sheets 18 and 19 which are overlapped and secured together along vertical lines by rivets 20. The outer vertical edges of these sheets are formed with flanges 21—22, respectively, which overlap the side sheathing 14 of the car and are secured to the side framing by bolts 23 which extend through the corner posts 10. The lower edges of the sheets 18—19 are formed with flanges 24 which extend under the flooring 17 so as to provide a grain proof connection at this point and are secured to the under framing of the car by bolts 25 and the upper edges of the sheet are secured to the end plate 12 by bolts 26. These sheets are formed with a plurality of parallel vertically extending corrugations 27 which merge one with another and extend substantially from the flooring of the car to the roof thereof. The corrugations 27 are preferably pressed inwardly from the plane of the sheets so as to provide maximum clearance between adjacent cars and terminate with the usual tapered terminals within the upper and lower edges of the sheets. A vertically disposed sheet 28 is secured, preferably, to the outer face of the sheets 18—19 adjacent the vertical center of the end wall so as to overlap the adjacent edges of these sheets. The sheet 28 is provided with a plurality of outwardly pressed corrugations 29 which are oppositely disposed with relation to certain of the corrugations adjacent the inner edges of the sheets 18—19 and is provided with flat marginal edges 30, the flat margins 30 and also the corrugated portion of the sheet 28 being secured to the sheets 18—19 by rows of rivets on opposite sides of the overlapped corrugations 27. With this construction, it will be noticed, the end structure is provided with a plurality of tubular beams which extend from the floor of the car to substantially the roof so as to provide a central rigid support for the roof structure of the car. By reinforcing the end structure in this manner it is possible to dispense with the usual end posts of the car framing and at the same time provide suitable reinforcement to resist the cargo thrusts adjacent the vertical center line of the car. By forming the corrugations 27 on the sheets 18—19 so that they extend inwardly it is possible to reinforce the vertical center portion of the end structure by means of a metal sheet or panel having outwardly pressed corrugations without conflicting with the provisions of the Interstate Commerce Commission relating to the clearances between adjacent cars. This provision requires that twelve inches be provided between the end ladders of adjacent cars for a distance of thirty inches from the sides of the car. The portion of the end intervening between the end ladders 31, if desired, may extend outwardly beyond the above prescribed clearance limit.

Figure 6:
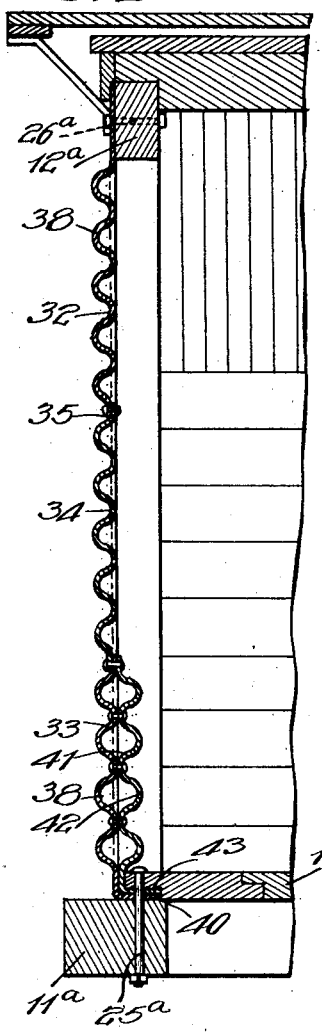
Fig. 6 is a vertical section taken on line 6—6 of Fig. 4.
Figure 4:
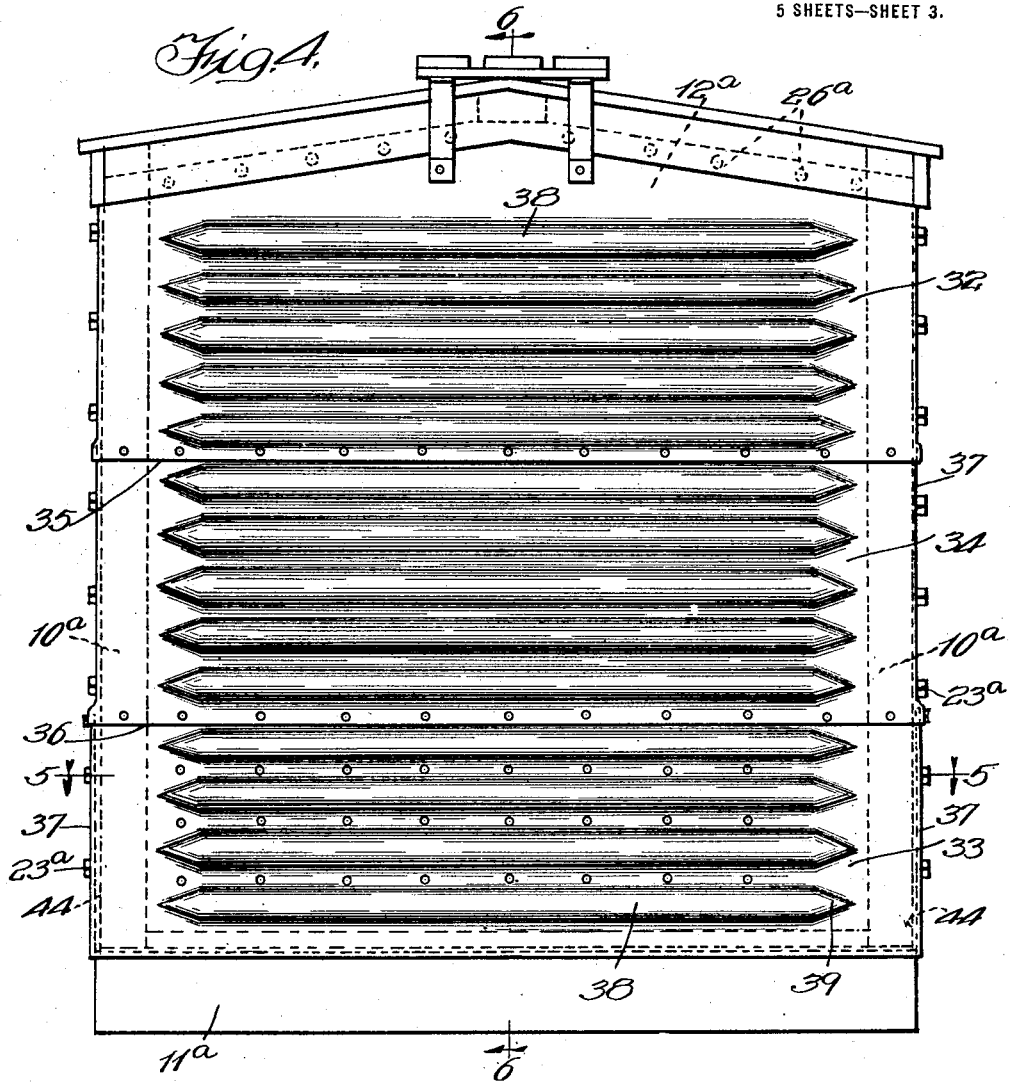
Fig. 4 is a view similar to Fig. 1 illustrating a modified construction.
Figure 5:
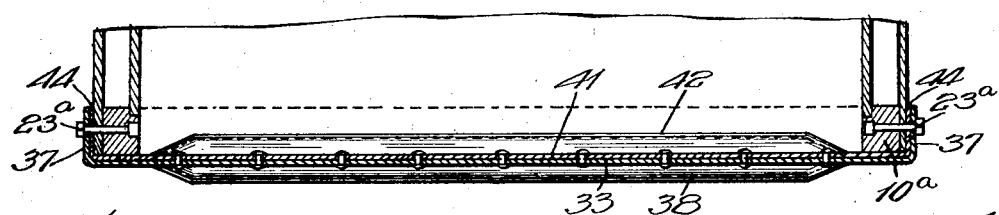
Fig. 5 is a sectional plan taken on line 5—5 of Fig. 4.

Referring to Figs. 4 to 6 inclusive, in which I have shown a modified construction consisting of a plurality of horizontally disposed sheets formed with parallel corrugations which extend across the car from side to side. This modified construction preferably consists of an upper sheet 32, lower sheet 33 and intermediate sheet 34. The upper edge of sheet 32 is cut away at an angle corresponding to the slope of the roof and is secured to the end plate 12ᵃ of the car by bolts 26ᵃ. The adjacent edges of the sheets are overlapped as shown at 35—36 and secured together and the vertical edges are provided with angular attaching flanges 37 which are secured to the sides of the car by bolts 23ᵃ. The above mentioned sheets are preferably formed with a plurality of outwardly pressed corrugations 38 which terminate within the edges of the sheets with tapered terminals 39. The lower edge of the lower sheet is formed with an inturned flange 40 which extends under the flooring of the car. The lower portion of the end wall is reinforced by a horizontally disposed metal sheet 41, having a plurality of horizontally disposed, inwardly pressed corrugations 42 and having its lower and vertical edges bent rearwardly to provide flanges 43—44, respectively, corresponding to the flanges 37—40 of the lower sheet 33. The corrugations of the sheets 33—41 are oppositely disposed with relation to each other and the sheets are secured together by rows of rivets on opposite sides of the corrugations. By arranging the sheet 33 so that the corrugations 38—42 are oppositely disposed with relation to each other a very rigid structure is provided adjacent the flooring of the car which will effectively resist such cargo thrusts and also rigidify the car frame adjacent the floor line.

Figure 7:
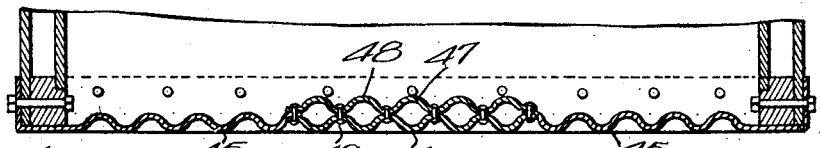
Fig. 7 is a view similar to Fig. 2 illustrating a modification.

In Fig. 7 of the drawings I have illustrated a modified construction in which the end panel is made up preferably of four corrugated sheets consisting of side sheets 45—45 and center sheets 46—47, which are formed with vertically extending corrugations 48 and arranged face to face and secured together by rivets 49 at points between the corrugations. The inner edges of the side sheets 45, 45 are preferably secured between the vertical edges of the center sheets 46, 47.

In Figs. 8 to 11 inclusive I have illustrated another modification in which the end panel is made up of sheets 50, 51 formed with vertically extending corrugations 52 and overlapped and secured together adjacent the vertical center of the car as indicated at 53. The upper edges of these sheets are bent over on diagonal lines to provide flanges 54, 55 which reinforce the upper portion of the end panel and provide a support for the ridge pole 56 and purlins 57. The central portion of the end panel is rigidified by means of a vertically extending sheet 58 formed with vertical corrugations which are vertically arranged opposite to said corrugations of sheets 50, 51 and the said sheets 50, 51, 58 are secured together by rivets 59 on opposite sides of the corrugations overlapped by the sheet 58.

In Fig. 12 is shown a further modification consisting of outer sheet 60 which may be constructed substantially the same as the sheets 50, 51 of the modification illustrated in Figs. 8 to 11 inclusive with the exception that the upper edges of the sheets are bent outwardly to provide flanges 61 to which the roof sheets 62 may be secured as indicated at 63. This construction is also provided with a centrally arranged vertically extending sheet 64 having oppositely disposed vertically extending corrugations substantially the same as that illustrated in the preceding figures and which is bent inwardly at its upper edge to provide a ridge pole supporting flange 65.

While I have described my invention in two specific embodiments it will be obvious that further modifications in structure might be made without departure from the spirit of my invention. I therefore do not wish to be limited to the exact structure shown and described except only in so far as specific limitations may appear in the appended claims.

I claim:

1. A metal end structure for railway cars comprising an end panel made up of a plurality of metal sheets provided with a plurality of rigidifying ribs and having their adjacent edges overlapped and secured together, and a metal sheet overlapping the edges of the first mentioned sheets and provided with rigidifying ribs which are disposed opposite to certain of the said ribs of the first mentioned sheets.

2. A metal end structure for railway cars comprising an end panel made up of metal sheets formed with a plurality of rigidifying corrugations and having their adjacent edges overlapped and secured together along vertical lines, and a sheet having a plurality of corrugations overlapping and arranged opposite certain of the corrugations of the first mentioned sheets and the sheets secured together on opposite sides of each of said corrugations to provide a series of tubular beams adjacent the vertical center of the panel adapted to resist the cargo thrusts.

3. A metal end structure for railway cars comprising metal sheets arranged side by side with adjacent margins overlapped along vertical lines and formed with a plurality of vertically extending corrugations, and a vertically disposed sheet overlapping the adjacent portions of the first mentioned sheets formed with a plurality of vertically extending corrugations arranged opposite to certain of the corrugations of the first mentioned sheets and secured to the first mentioned sheets on opposite sides of the opposed corrugations.

4. A metal end structure for railway cars comprising metal sheets arranged side by side with adjacent margins overlapped along vertical lines and formed with a plurality of inwardly pressed vertically extending corrugations, and a vertically disposed sheet overlapping the adjacent portions of the first mentioned sheets formed with a plurality of outwardly pressed vertically extending corrugations arranged opposite to certain of the corrugations of the first mentioned sheets and secured to the first mentioned sheets on opposite sides of the opposed corrugations.

5. The combination with the end framing of a railway car of a metal panel made up of a plurality of vertically disposed sheets having angular flanges adapted to be secured to the said framing and formed with a plurality of inwardly pressed corrugations, and a vertically disposed sheet secured to the first mentioned sheets adjacent the vertical center of the end and formed with a plurality of outpressed corrugations.

6. A metal end structure for railway cars comprising a panel made up of a plurality of corrugated sheets extending from top to bottom of the car, certain of said sheets being arranged with relation to each other so that the corrugations of one sheet will be opposite the corrugations of another sheet, the corrugations projecting from the respective sheets in opposite directions.

7. A metal end structure for railway cars, a metal sheet having a plurality of inwardly pressed corrugations and a sheet disposed adjacent the vertical center of the car formed with a plurality of outpressed corrugations.

8. A metal end structure for railway cars, a metal sheet having a plurality of inwardly pressed corrugations and a sheet disposed adjacent the vertical center of the car formed with a plurality of outpressed corrugations which overlap a plurality of the inwardly pressed corrugations of the first mentioned sheet.

9. A sheet metal end structure for a railway car comprising four sheets having vertically extending corrugations and two center sheets arranged face to face, overlapping the vertical edges of said side sheets and having oppositely disposed vertical corrugations; said center sheets being secured together on opposite sides of certain of said corrugations.

10. A sheet metal end structure for a railway car comprising metal sheets formed with vertically extending corrugations and overlapped adjacent the vertical center of the end and formed along their upper edges with inwardly bent flanges providing roof supporting members, and a central rigidifying member comprising a vertically disposed sheet formed with a plurality of vertically extending corrugations arranged opposite to certain of the corrugations of the first mentioned sheets.

11. A sheet metal end structure for a railway car comprising a plurality of metal sheets overlapped and secured together along vertical lines one of said sheets being bent inwardly at its upper edge to provide a supporting flange for the ridge pole of the car and another of said sheets being formed at its upper edge with an out turned flange adapted to rigidify the upper portion of the end structure and provide an attachment for the roof sheets.

12. A sheet metal end structure for a railway car, the side portions of which are composed, in each case, of a single thickness of sheet metal and the middle portion of which is composed of two sheets arranged face to face.

13. A sheet metal end structure for a railway car, the side portions of which are composed, in each case, of a single thickness of sheet metal and the middle portion of which is composed of two sheets arranged face to face, said structure being formed with a plurality of vertically extending rigidifying corrugations.

14. A car end structure comprising a sheet metal panel extending across the car from side to side and a metal plate secured thereto adjacent the vertical center line of the panel.

15. A car end structure comprising a sheet metal panel extending across the car from side to side and a metal plate secured thereto adjacent the vertical center line of the panel, said structure being formed with rigidifying ribs.

16. A car end structure comprising a sheet metal panel extending across the car from side to side and a metal plate secured thereto adjacent the vertical center line of the panel, said structure being formed with vertically extending rigidifying ribs.

17. A car end structure comprising a sheet metal panel extending across the car from side to side and formed with rigidifying ribs and a metal plate secured thereto adjacent the vertical center line of the panel.

18. A car end structure comprising a sheet metal panel extending across the car from side to side and formed with vertical rigidifying ribs, and a metal plate secured thereto adjacent the vertical center line of the panel.

19. A car end structure comprising a sheet metal panel extending across the car from side to side and a metal plate secured thereto adjacent the vertical center line of the panel and formed with rigidifying ribs.

20. A car end structure comprising a sheet metal panel extending across the car from side to side and formed with vertical rigidifying ribs, and a metal plate secured thereto adjacent the vertical center line of the panel and formed with vertically extending rigidifying ribs.

21. A car end structure comprising a sheet metal panel extending across the car from side to side and a metal plate secured thereto adjacent the vertical center line of the panel, said panel and plate being formed with rigidifying ribs.

22. A car end structure comprising a sheet metal panel extending across the car from side to side and a metal plate secured thereto adjacent the vertical center line of the panel, said panel and plate being formed with vertically extending rigidifying ribs.

23. A car end structure comprising a sheet metal panel extending across the car from side to side and a metal plate secured thereto adjacent the vertical center line of the panel, said plate and panel being formed with alining, oppositely extending, rigidifying ribs.

24. A car end structure comprising a sheet metal panel extending across the car from side to side and a metal plate secured thereto adjacent the vertical center line of the panel, said panel and plate being formed with alining, oppositely extending, vertical rigidifying ribs.

25. A car end structure comprising a sheet metal panel extending across the car from side to side and composed of a plurality of sheets with adjacent marginal portions overlapped, and a metal plate secured thereto adjacent the vertical center line of the panel.

26. A car end structure comprising a sheet metal panel extending across the car from side to side and composed of a plurality of sheets with adjacent marginal portions overlapped and formed with vertical corrugations, and a metal plate secured thereto adjacent the vertical center line of the panel.

27. A car end structure comprising a sheet metal panel extending across the car from side to side and composed of a plurality of sheets with adjacent marginal portions overlapped, and a metal plate secured thereto adjacent the vertical center line of the panel and formed with vertically extending rigidifying ribs.

28. A car end structure comprising a sheet metal panel extending across the car from side to side and composed of a plurality of sheets with adjacent marginal portions overlapped and formed with vertical corrugations, and a metal plate secured thereto adjacent the vertical center line of the panel and formed with vertically extending rigidifying ribs.

29. In combination with a box car, a sheet metal end structure comprising a panel extending from side to side of the car and from floor to roof, and a metal plate narrower than the panel and secured to the middle portion thereof.

30. In combination with a box car, a sheet metal end structure comprising a panel extending from side to side of the car and from floor to roof, and a metal plate narrower than the panel, secured to the middle portion thereof and extending from floor to roof of the car.

31. In combination with a box car, a sheet metal end structure comprising a panel extending from side to side of the car and from floor to roof and formed with rigidifying ribs, and a metal plate narrower than the panel secured to the middle portion thereof.

32. In combination with a box car, a sheet metal end structure comprising a panel extending from side to side of the car and from floor to roof and formed with vertical, rigidifying ribs, and a metal plate narrower than the panel secured to the middle portion thereof.

33. In combination with a box car, a sheet metal end structure comprising a panel extending from side to side of the car and from floor to roof and formed with vertical rigidifying ribs, and a metal plate narrower than the panel secured to the middle portion thereof and formed with rigidifying ribs.

34. In combination with a box car, a sheet metal end structure comprising a panel extending from side to side of the car and from floor to roof and formed with vertical rigidifying ribs, and a metal plate narrower than the panel secured to the middle portion thereof and formed with vertical rigidifying ribs.

35. In combination with a box car, a sheet metal end structure comprising a panel extending from side to side of the car and from floor to roof, and a metal plate narrower than the panel and secured to the middle portion thereof, both panel and plate being formed with a plurality of rigidifying ribs.

36. In combination with a box car, a sheet metal end structure comprising a panel extending from side to side of the car and from floor to roof, and a metal plate narrower than the panel and secured to the middle portion thereof, both panel and plate being formed with a plurality of rigidifying ribs, the ribs of the plate alining with certain ribs of the panel.

SAMUEL H. CONWELL.